W. P. BOVARD.
METALLIC JOINT AND METHOD OF PRODUCTION.
APPLICATION FILED JAN. 22, 1920.

1,410,647.

Patented Mar. 28, 1922.

Inventor
William P. Bovard
By
Attorney

UNITED STATES PATENT OFFICE.

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

METALLIC JOINT AND METHOD OF PRODUCTION.

1,410,647.        Specification of Letters Patent.      Patented Mar. 28, 1922.

Application filed January 22, 1920. Serial No. 353,149.

*To all whom it may concern:*

Be it known that I, WILLIAM P. BOVARD, a citizen of the United States of America, residing at Mansfield, in the county of Richland and State of Ohio, have invented certain new and useful Improvements in Metallic Joints and Methods of Production, of which the following is a specification.

My invention relates to the method of uniting structural work and the product of such method, such as steel structures of buildings, bridges, apparatus, etc., and I have shown it as being applied to a track structure.

One object of my invention is to produce a structure in which the adjacent members are most strongly secured together mechanically and in the case of track rails used for conducting electric current the electrical conductivity of the structure is materially increased.

Another object of my invention is to be able to make use of present parts of structures and to provide in such cases convenient means for properly welding the parts together. This is particularly illustrated in the use of present day splice bars or plates in combination with rails in which the upper edge of the splice bar is flush with the outer side face of the ball of the rail, and therefore no shelf or ledge is offered upon which to weld the parts together.

Another object of my invention is to provide a means for permitting the application of the heating flame to the parts in such a manner that the weld will extend into the very corner formed by the angle of the parts at the point the parts are to be welded together. This is done by projecting into the corner of the angle which is to be welded together and possibly filled with additional welding metal, a metal member which projecting from the corner is readily acted upon by the heat of the welding flame which may be either a gaseous flame such as the oxyacetylene flame or the flame of the electric arc. It is found in practice with such methods of welding that the flame of the oxy-acetylene torch is reflected from the very corner of the angle and the heat therefore does not reach the very corner and where the electric arc is used the arc naturally strikes to the nearest metal surface and this, as is readily seen, is not the extreme corner of the angle formed by the parts to be welded. Therefore, the surface of the parts at their meeting point is not thoroughly fused and united.

These and other new and useful objects as will appear later are secured and obtained by the novel construction, combination and arrangement of parts of which my invention is composed and which will appear later as more fully described and claimed and shown in the accompanying drawings in which:

Figure 1:
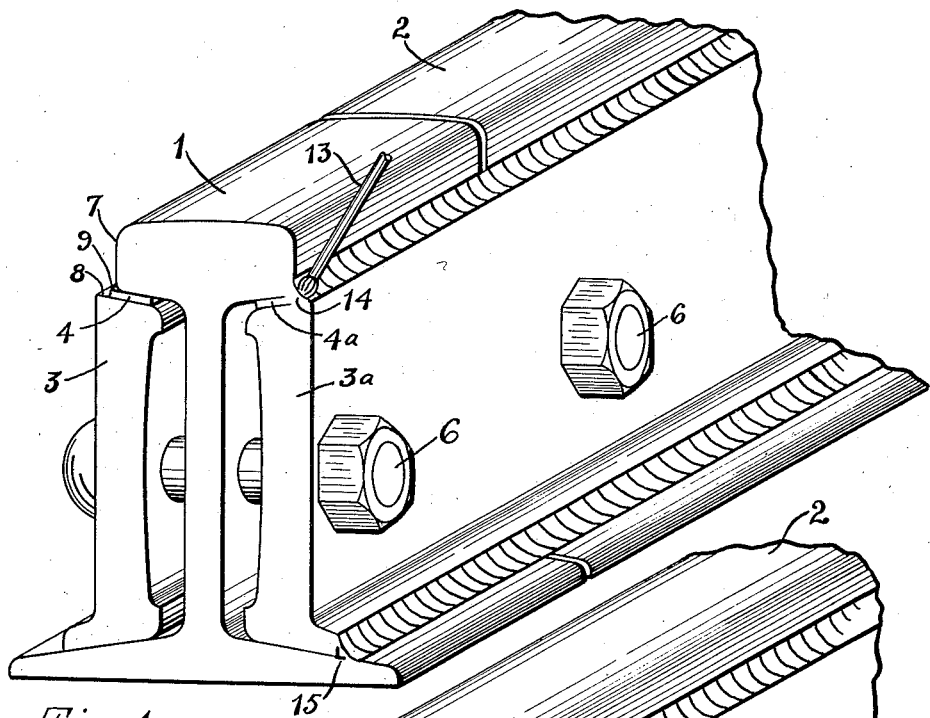
Fig. 1 is a perspective view of two adjoining rails to which my invention has been applied to the adjacent parts of the ball of the rail and the upper edge of the fish plate.
Figure 2:
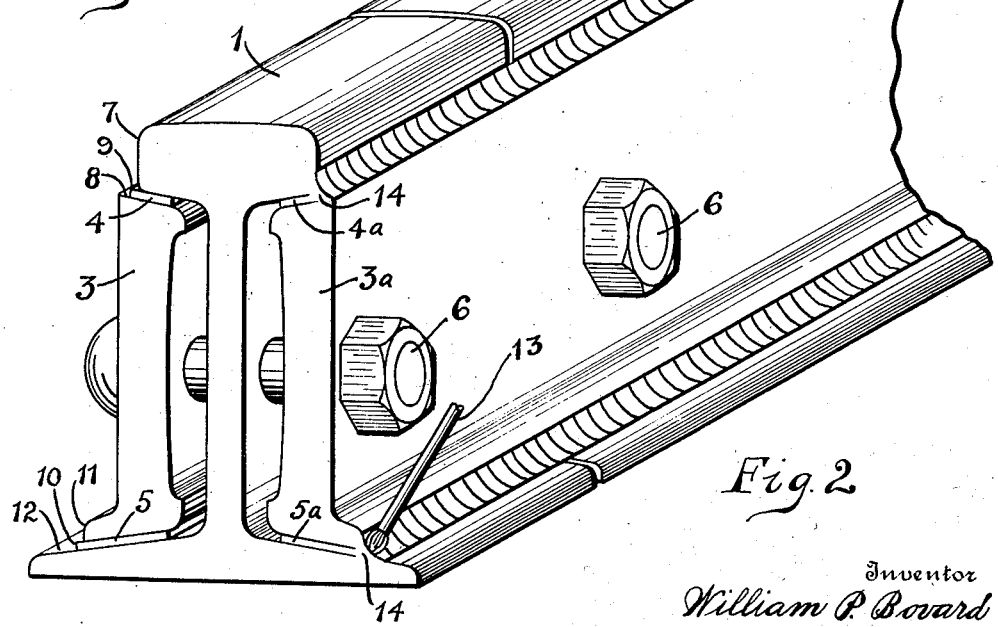
Fig. 2 is a perspective view of two adjacent rails in which my invention has been applied, not only to the upper adjacent parts of the rail head and splice bar, but to the adjacent parts of the flange or base of the rail and the lower edge of the splice bar.

As shown in the drawing, there are illustrated two adjacent rails indicated by numerals 1 and 2. These are united by the usual splice plate or bar indicated by 3—3ª. In Fig. 1 there is shown inserted between the ball of the rail and the upper edge of the splice plate, an auxiliary or insert member which I have also termed a "spacer" indicated by numerals 4 and 4ª. In Fig. 2 I have shown spacers 5 and 5ª between the lower edges of the splice bars and the adjacent faces of the rail base in addition to the spacer between the ball or head of the rail and the upper edge of the splice bar.

Among the various advantages of this spacer member which is inserted between the splice plate and flanges of the rail and then all parts securely held together by the usual fastening means and which I have shown as the bolt and nut 6, are the offsetting or projecting of the splice bar relatively to the upper face of the ball of the rail, thereby forming a shelf upon which the fused metal used in uniting the parts together can be received and retained. Also the spacer projecting into the angle formed by the face 7 of the ball of the rail and the upper edge 8 of the splice bar fills in the extreme inner corner of the angle thus formed and permits the heating flame to be more efficiently applied.

It has been found a difficult matter to cause the heating flame to reach the extreme corner of such an angle and fuse the parts together where the parts meet, but by projecting the spacer 4 into the angle as shown by the numeral 9, the heating flame will act upon the projecting part 9 of the spacer 4 and the same will be readily fused and unite with the surrounding faces of the parts which will also be readily fused.

As there are many hundred of miles of track laid in which the splice bars at their upper edge do not project beyond the face 7 of the ball of the rail, by inserting the spacer between the upper edge and ball of the rail on such construction the splice bar is caused to project and forms the supporting ledge or shelf 8 for the welding metal.

The spacer can also be applied to the lower edge of the splice bar as indicated by the parts 10—11—12.

In welding the parts together I have shown a member 13 which represents a metal electrode composed of the metal which it is desired to form a weld with, but I do not wish to be limited to the use of this exact method of welding as there are other equivalent methods well known at the present time, such as the use of a carbon electrode and the gaseous heating flame already mentioned.

To weld the parts together, the electrode 13, which is secured to a proper source of electric current, is brought into contact with the rail and splice bar at the point of weld and an arc is thus formed when the electrode 13 is drawn away from the rail in a slight degree. This arc heats the parts immediately surrounding the same and brings them up to the point of fusion and simultaneously the electrode is melted away and such metal falls upon the fused area of the parts 7 and 8, and during this process the arc readily acts upon the projecting part 9 of the spacer 4 and fuses the same into an integral union with the other adjacent part. The fused metal from the electrode 13 forms a fillet in the angle formed by the parts 7 and 8 and when this fillet is of sufficient size the arc is moved to an adjacent point and the process is repeated and so on until the necessary length or area has been properly fused and welded to unite the parts into an integral union, as indicated at the point 14.

In Fig. 1 where the base of the rail and lower edge of the splice bar form an angle I have shown the same welded as by the old method which is merely melting down the splice bar and adding metal thereto until a proper amount of metal has been fused, but in this process, while the angle formed by the parts may appear to be filled with fused metal, such fused metal will not be integrally united to the parts in the very corner of the angle as shown at 15 in Fig. 1.

It will be found that there will be occasions when it will not be necessary to add metal to the welded joint as above described as the joint will be sufficiently strong by merely fusing the adjacent parts 7, 8 and 9 together or the parts 10, 11 and 12. The projecting metal 9 and 10 will under such circumstances tend to form a small fillet in the corner of the angle of the parts.

Where additional metal is added to the welded joint, this metal may be of the same character as the parts welded; for instance in the case of rails the additional welding metal may be of a ferrous character or the welding metal may be of bronze, copper, etc.

Having shown and described my invention, I do not wish to be limited to the exact method and construction shown and described, as there are variations which can be made and which will be readily recognized by one skilled in the art and which will come within the scope of my invention, but what I do claim and desire to secure by Letters Patent is:—

1. The method of uniting adjacent structural members provided with flanges consisting in applying thereto and extending between the flanges an overlapping plate forming an angle with the adjacent faces of the structural members with an insert of metal between the structural members and the plate and projecting into the angle formed by the structural members and said plate, then heating the adjacent parts forming the angle and the projecting insert and fusing the insert into integral union with the adjacent structural members and plate thereby uniting all parts.

2. The method of uniting adjacent structural members provided with flanges in applying thereto and extending between the flanges an overlapping plate so positioned as to form an angle with adjacent faces of the structural members and one of the faces of each angle forming a shelf to catch and support the fused metal and with an insert of metal between the parts and projecting into the angle, then heating the adjacent faces of the flanges and plate and melting the exposed parts of the inserts to form a uniting fillet between the flange and plate.

3. The method of uniting adjacent structural members provided with flanges consisting in applying thereto and extending between the flanges an overlapping plate so positioned as to form an angle with the adjacent faces of the structural members and one face of the plate forming a shelf to catch and support the fused metal and with an insert of metal between the parts and projecting into the angle, then heating the adjacent faces of the flanges and plate and melting the exposed parts of the insert to unite with the heated faces of the flanges and plate to form an integral union between.

4. The method of uniting adjacent structural members provided with flanges consisting in applying thereto and extending between the flanges an overlapping plate so positioned as to project from one flange and form a shelf, and an angle with the other flange in which case the flange forms a shelf and having an insert of metal between the flange and the plate and extending into the apex of the angle formed by the flange and plate, then applying a heating flame to the flange, plate and exposed insert and fusing the parts together to form an integral union.

5. The method of uniting two adjacent structural members having their edges in juxtaposition consisting in applying thereto an overlapping member, the edges of the overlapping member forming with each structural member angles therewith, then positioning between the structural member and overlapping member an insert of welding metal projecting into the apex of the angle, then applying a heating flame to the parts forming the angle and the insert within the angle and fusing the insert into integral union with the adjacent faces of the parts forming the angle, thereby uniting the structural and overlapping members.

6. The method of uniting adjacent structural members provided with flanges consisting in applying thereto and extending between the flanges an overlapping plate projecting from one flange and with an interposed insert of welding metal projecting from such flange between the flange and the adjacent edge of the plate or bar, then heating the adjacent parts of the flange insert and plate and melting the projecting part of the insert to form a fillet and unite with the flange and plate to retain the flange and plate in an integral union.

7. The method of connecting abutting members consisting in applying thereto an overlapping plate and placing the same in projecting relation to a face of the members to form an angle therewith and a shelf or support for fused metal, then interposing an auxiliary member of welding metal between the members and the plate and projecting into the angle formed by the members and plate to unite the plate and members, then applying a heating flame to the adjacent parts forming the angle and to the exposed portion of the auxiliary member and fusing the auxiliary member into integral union with the members and plate to unite the same.

8. A structural joint comprising a pair of adjacently disposed members placed end to end and provided with a plurality of flanges, an overlapping plate interposed between the flanges and projecting from the face of one flange to form an angle, an auxiliary member interposed between the flange and the plate and having one edge fused and united to the faces of the flange and plate within the angle to unite the members and the plate.

9. A built up structural structure consisting of a pair of adjacently disposed members placed end to end and provided with a projecting flange, an overlapping plate adjacent the flange and projecting from the edge of the flange, an auxiliary member inserted between the members and the plate and having one edge and the adjacent edges of the members and plate fused into an integral union with additional metal fused thereto to further unite the parts.

10. A structural joint comprising a pair of adjacently disposed members placed end to end and provided with a pair of projecting flanges, an overlapping splicing plate interposed between the flanges and forming an exposed angle with the adjacent face of each flange, an insert positioned between the splicing plate and each flange and one edge forming an integral union with the adjacent faces of the flange and splice bar to unite the bar and structural members along their longitudinal edges.

11. The method of welding a plurality of metallic parts together consisting in positioning the parts together with the exposed adjacent faces of the parts forming an angle, interposing a metallic member between the parts and projecting it into the angle formed by the adjacent faces of the parts, then heating the adjacent parts and fusing the projecting portion of the insert into molecular union with parts to unite the parts.

12. The method of uniting adjacent structural members provided with flanges consisting in applying thereto and extending between the flanges an overlapping plate forming an angle with the adjacent faces of the structural members with an insert of metal between the structural members and the plate and projecting into the angle formed by the structural members and plate, then heating the adjacent parts forming the angle and the projecting insert and fusing the insert into integral union with the adjacent structural members and plate thereby uniting all parts, and then adding fused metal from an auxiliary source to the joint to further fill the angle and strengthen the union of the members and plate.

In testimony whereof I affix my signature.

WILLIAM P. BOVARD.